United States Patent
Peters et al.

(10) Patent No.: US 8,935,758 B2
(45) Date of Patent: Jan. 13, 2015

(54) SYSTEM AND METHOD FOR CHECKING THE AUTHENTICITY OF THE IDENTITY OF A PERSON ACCESSING DATA OVER A COMPUTER NETWORK

(75) Inventors: Rik Peters, Etten-Leur (NL); Reinier Maria Van Der Drift, Heerenveen (NL); Menno Stijl, Boskoop (NL)

(73) Assignee: Authasas BV, Amsterdam (NL)

( * ) Notice: Subject to any disclaimer, the term of this patent is extended or adjusted under 35 U.S.C. 154(b) by 128 days.

(21) Appl. No.: 13/635,884

(22) PCT Filed: Mar. 18, 2011

(86) PCT No.: PCT/NL2011/000021
§ 371 (c)(1),
(2), (4) Date: Nov. 18, 2012

(87) PCT Pub. No.: WO2011/115478
PCT Pub. Date: Sep. 22, 2011

(65) Prior Publication Data
US 2013/0263224 A1    Oct. 3, 2013

(30) Foreign Application Priority Data

Mar. 18, 2010   (NL) .................................... 1037813

(51) Int. Cl.
*G06F 7/04* (2006.01)
*G06F 21/31* (2013.01)
*G06F 21/62* (2013.01)

(52) U.S. Cl.
CPC ............ *G06F 21/31* (2013.01); *G06F 21/6218* (2013.01); *G06F 2221/2113* (2013.01); *G06F 2221/2141* (2013.01)
USPC ...... 726/4; 726/6; 726/10; 713/170; 713/161; 713/187; 455/410

(58) Field of Classification Search
CPC .......... H04L 9/32; H04L 9/0813; H04L 63/08; H04W 12/00; G06F 21/30; G06F 21/45
USPC ............ 726/11, 7, 2, 64, 6, 10; 713/186, 168, 713/170, 161
See application file for complete search history.

(56) References Cited

U.S. PATENT DOCUMENTS 7,900,259 B2 *   3/2011   Jeschke et al. .................. 726/25
7,913,092 B1 *   3/2011   Hiltunen et al. ............... 713/187

(Continued)

OTHER PUBLICATIONS

Yinan Li, Threshold identity Authentication of Ad Hoc Network, Dec. 2009, IEEE, vol. 12, pp. 1-3.*

*Primary Examiner* — Dede Zecher
*Assistant Examiner* — Viral Lakhia
(74) *Attorney, Agent, or Firm* — Troutman Sanders LLP; Ryan A. Schneider; Benjamin C. Wiles

(57) ABSTRACT

A data processing system (100) comprises: a database (4); a host computer (3) and a user computer (1) capable of communicating with each other over a network (2); wherein the user computer sends a data request message (RQ) to the host computer (3), the request message containing Data information (RD), Identity information (RI), and Authenticity information (A; VI), wherein the host computer (3) checks the authentication information and only sends the required data if the Identity information (RI) defines an authorized user and the authentication information (A; VI) authenticates the user identification information. The request message further contains secondary information (RT) and the host computer (3) calculates, from the secondary-information, a reliability value (R), compares the calculated reliability value with a predefined reliability threshold, and sends the required data only if the reliability value is at least as high as the reliability threshold.

8 Claims, 2 Drawing Sheets

(56) References Cited

U.S. PATENT DOCUMENTS

| | | | |
|---|---|---|---|
| 8,224,753 B2* | 7/2012 | Atef et al. | 705/64 |
| 8,250,097 B2* | 8/2012 | Rhodes | 707/783 |
| 8,418,239 B2* | 4/2013 | Deishi | 726/10 |
| 8,578,446 B2* | 11/2013 | Takamizawa et al. | 726/2 |
| 8,601,602 B1* | 12/2013 | Zheng | 726/29 |
| 8,819,432 B2* | 8/2014 | Bergsten et al. | 713/170 |
| 2007/0061590 A1* | 3/2007 | Boye et al. | 713/186 |
| 2008/0168534 A1* | 7/2008 | Takamizawa et al. | 726/2 |
| 2009/0300744 A1* | 12/2009 | Guo et al. | 726/7 |
| 2010/0138908 A1* | 6/2010 | Vennelakanti et al. | 726/11 |
| 2010/0180127 A1* | 7/2010 | Li et al. | 713/186 |
| 2010/0185871 A1* | 7/2010 | Scherrer et al. | 713/186 |
| 2012/0317622 A1* | 12/2012 | Harjanto et al. | 726/4 |

\* cited by examiner

SYSTEM AND METHOD FOR CHECKING THE AUTHENTICITY OF THE IDENTITY OF A PERSON ACCESSING DATA OVER A COMPUTER NETWORK

This application is a U.S. National Stage of International Application No. PCT/NL 2011/000021, filed 18 Mar 2011, which claims the benefit of NL 1037813,, filed 18 Mar.

FIELD OF THE INVENTION

The present invention relates in general to to a system for checking the authenticity of the identity of a person logging into a computer network.

BACKGROUND OF THE INVENTION

FIG. 1 schematically shows a database with data, indicated by reference numeral 1. A host computer associated with the database 4 is indicated by reference numeral 3. A user computer is indicated by reference numeral 1. The user computer 1 and the host computer 3 are capable of communicating with each other over a network 2, which may include a wireless communication path and/or a wired communication path, and which may include the internet.

In a simple situation, the user computer 1 sends a request message to the host computer 3 (hereinafter also simply indicated as "host"), identifying the data required, and the host 3 receives the request message, processes the information identifying the required data, retrieves the required data from the database 4, and sends a response message to the user computer 1, this response message containing the required data.

Such a setup works adequately if the data concerned is accessible to anybody. However, there are many examples where data access is restricted to authorized persons only. One important example is patient information, where access is restricted with a view to privacy. Another example is a company, where workers are allowed to access their own files but are not allowed to access the work files of other workers, while only some workers are allowed to access the bookkeeping data. Another example is a bank account. Another example on a smaller scale is access to a laptop or USE stick or other type of easily portable data storage device. In such cases, the host 3 is provided with a memory 5 (see FIG. 2), containing information (for instance in the form of a table) defining a relationship between persons and the data they are allowed to access. In the request message, user identification information (for instance a name or a log-in code) is contained, identifying the user person using the user computer 1. The host checks this user identification information to identify the user, determines which data this user is authorized to access, and checks whether the requested data is part of the data accessible to this user.

Now a problem is that the host 3 has no idea whether or not the user using the user computer 1 actually is the person he claims to be. For this problem, some kind of authentication procedure is necessary, to assure the authenticity of the user identification information.

For authenticating the user identification authenticity, many possibilities exist. One simple possibility is entering a password, for instance using a keyboard or any other suitable type of input device. The password should be known to the bonafide user only. The host only receives the password information, but does not know whether the password has been inputted by the bonafide user or by a malafide user, hereinafter also indicated as "imposter". Thus, the mere fact that the host 3 receives the correct password is not a true guarantee that the person operating the user PC 1 is actually the authorized person: it is possible that the authorized person has given (voluntarily or not) the password details to someone else, it is possible that an imposter has guessed correctly, and it is even possible that an imposter has stolen the password details, for instance by watching the authorized person, or by finding a notebook in which the authorized person hase noted his password, to name a few examples.

Another possibility for authenticating the user identity it to use a unique machine-recognizable object, for instance a magnet card with a magnetic strip, in which case the user PC 1 will be equipped with a card reader device 6 (see FIG. 3). Cards with magnetic strips (or alternatively a chip) containing information, as well as suitable readers, are known per se. For another type of information-carrying object, a corresponding type of reader is required, as will be clear to a person skilled in the art. This approach involves already increased safety, but nevertheless it is possible that the original card has been stolen or copied.

Yet another possibility for authenticating the user identity is to use the recognition of body features that are unique to the actual body of the authorized person. For instance, fingerprint scanners and iris scanners are commonly known and commercially available. However, whereas a card reader may read information from a card and send this information to the host 3, detection of body features typically involves a recognition process in the scanner, which in a learning mode has scanned and stored the body feature concerned, and which in normal operation compares the momentarily scanned information with the stored information, and basically generates YES/NO information to be sent to the host. This will make it difficult to implement such authentication procedure in case where a user is mobile and wishes to use different PCs in different locations.

Summarizing, in general, there may be multiple types of authentication methods available, requiring different types of information and requiring different types of readers, while it may be that the user has not always all information carriers with him (he may simply have forgotten to take along his magnet card) and it is also possible that not all access locations (PCs 1) are equipped with all possible types of readers. Further, it may be that some type of information requires a higher level of protection than some other type of information (patient information could for instance require a much higher level of protection against unathorized access than a draft article for the personnel magazine).

A further complication may be that certain information carriers are or become less reliable than others. For instance, in a system based on the use of magnetic cards or chip cards, it is conceivable that such cards originate from different providers. A government may for instance provide identity cards (passports, drivers licence) of very high quality, handed out to the intended user in person only when he identifies himself. A company may for instance use cheaper cards of lower quality. Or the issuing process may be less safe because cards are sent by mail or are left in a collection for the intended user to pick from. It is further conceivable that the encryption of cards which are safe today is compromised tomorrow so that the cards can easily be copied and are therefore less safe.

SUMMARY OF THE INVENTION

It is an objective of the present invention to eliminate or at least reduce the above problems.

In a system according to the present invention, the user PC not only sends to the host information defining the user (name) and information relating to authenticity (such as password), but also sends to the host secondary information regarding the authentification method used (for instance card reader, fingerprint scanner) including information defining the apparatus used (manufacturer, type) and information defining the card used (manufacturer, type, age). In case multiple methods are used (password as well as card), this is also notified to the host. The host is equipped with a further memory containing a relationship (for instance in the form of a table) between the secondary information and a reliability value. In use, the host processes the secondary information, calculates the reliability value using said relationship and said secondary information, compares the reliability value with a predefined reliability threshold, and grants access only if the reliability value is at least as high as the reliability threshold.

Thus, apart from information relating to the identity of the user (WHO is the user) and information relating to the authenticity (identity proof), the host also receives information on the reliability of the authenticity, and it is possible for the user to be satisfied with low-level anthenticity in some cases and to require highly reliable authenticity in other cases. Thus, it is possible that some kind of data is accessible with a password while other types of data are only accessible with a chip cards or with biometric data. It is for the network operator to define a reliability threshold per data target. Further, in case a certain type of authentication process becomes compromised, for instance a certain type of chip card is hacked, it is possible for the network operator to simply and quickly lower the reliability value associated with that specific authentication process, so that this process is no longer accepted for accessing highly sensitive data.

BRIEF DESCRIPTION OF THE DRAWINGS

These and other aspects, features and advantages of the present invention will be further explained by the following description of a preferred embodiment with reference to the drawings, in which same reference numerals indicate same or similar parts, and in which.

DETAILED DESCRIPTION OF THE INVENTION

Figure 1:
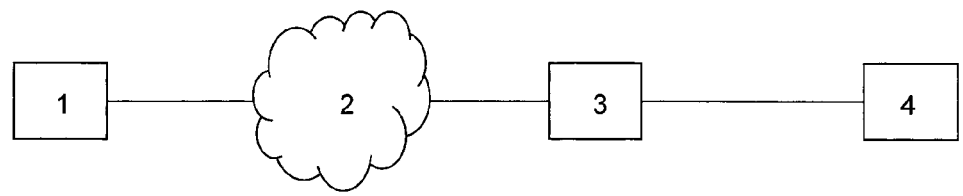
FIGS. 1-3 are block diagrams schematically illustrating a network according to the state of the art.
Figure 2:
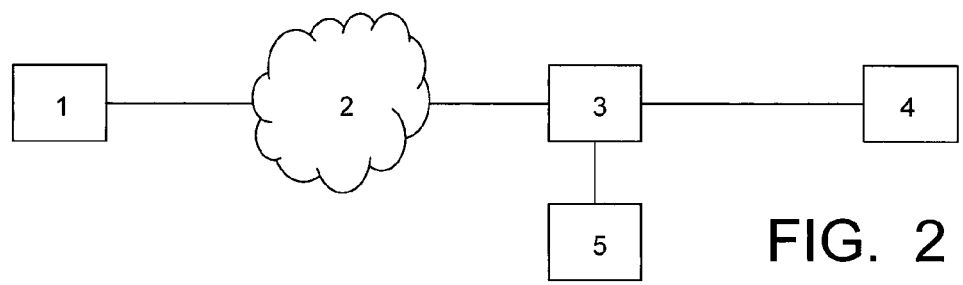
Figure 3:
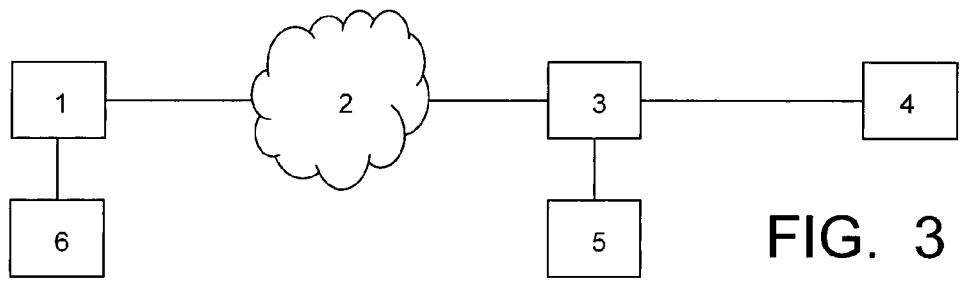
Figure 4:
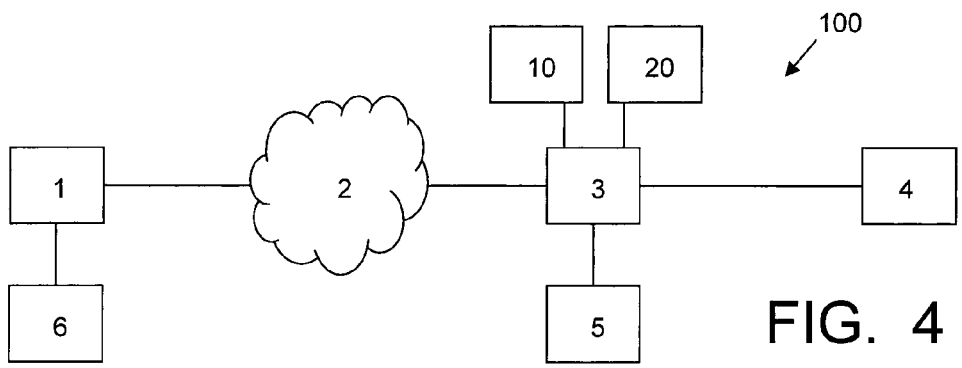
FIG. 4 is a block diagram schematically illustrating a network according to the present invention.
Figure 5:
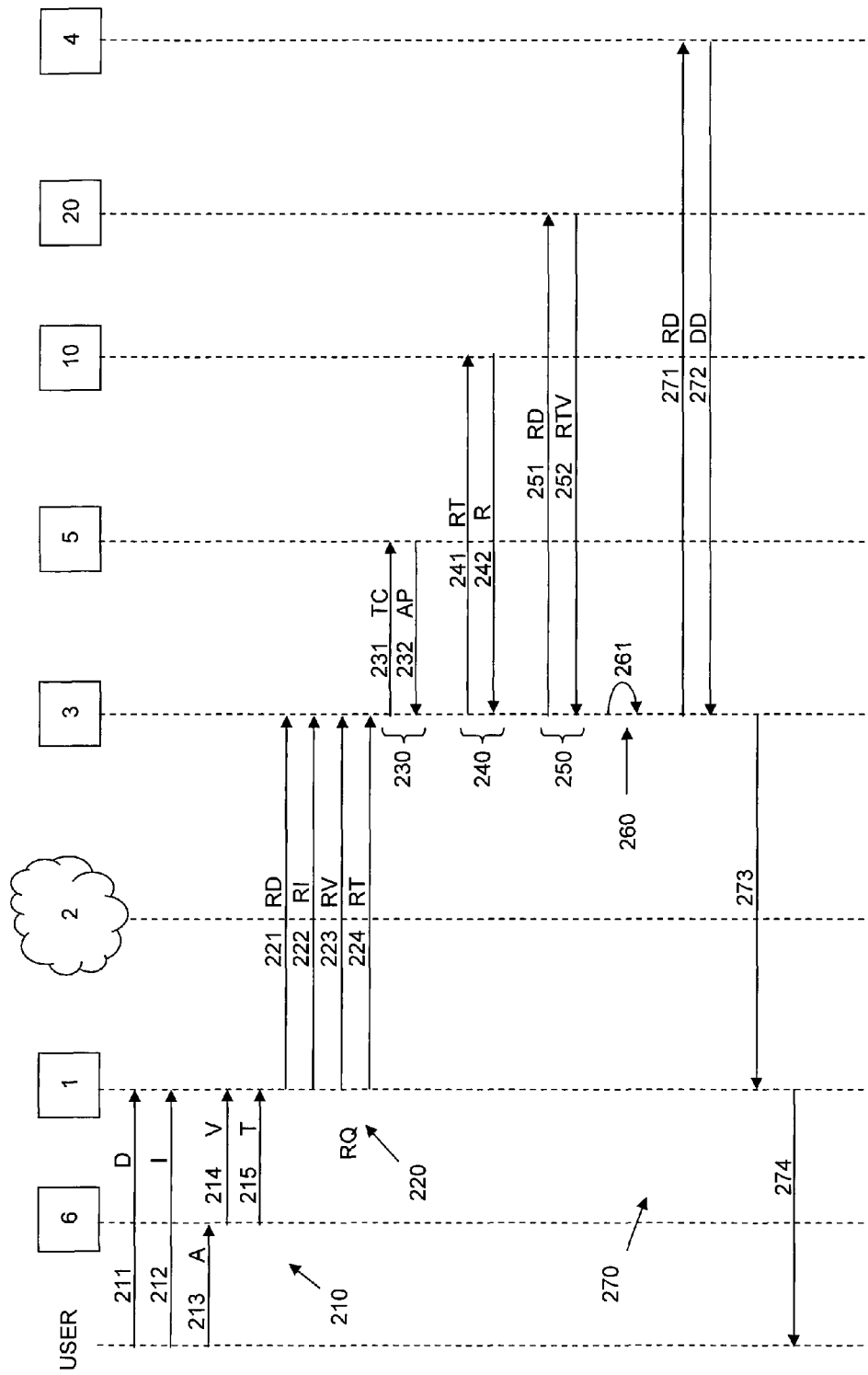
FIG. 5 is a flow diagram schematically illustrating the information flow in the network according to the present invention.

With reference to FIGS. 4 and 5, a data processing system 100 according to the present invention comprises the host 3 equipped with a reliability value definition memory 10. This memory 10 contains a table (or other type of relationship) defining a predetermined reliability value for a certain authentication parameter, which parameter may relate to type of authentication process, manufacturer of information carrier, process for issuing the information carrier, type of reading device, etc. The host 3 is further equipped with a reliability threshold definition memory 20. This memory 20 contains a table (or other type of relationship) defining, for defined portions of the data in database 4, associated reliability thresholds.

The operation is as follows, in seven suboperations.

In a first suboperation 210, the user inputs request information to the user PC 1. This request information includes Data information D (step 211), defining the data the user wishes to access, and Identity information I (step 212) defining the identity of the user (for instance a name). The user also inputs Authenticity information A into a reader 6 (step 213), which may be a password, a chip card, or even biometric data, as explained in the above. The reader 6 passes information to the user PC 1. This information includes Validity information V (step 214), which may be the Authenticity information A itself (in the case of a password), may be data derived from a data carrier (in the case of a chip card or the like), or information stating that the Authenticity information A has been verified (in the case of biometric data). The information further includes authentication Type information T (step 215), defining one or more of the type of authentication process type, manufacturer of reader, type of reader, manufacturer of data carrier, provider of data carrier, protocol through which the data carrier is issued to the user, etc.

In a second suboperation 220, the user PC 1 sends a request RQ to the host 3. This request RQ contains, perhaps in encrypted form, the requested data (RD; step 221), the user identity (RI; step 222), the identity Validity information (RV; step 223), and the authentication Type information (RT; step 224). Steps 221, 222, 223, 224 may be performed simultaneously, i.e. the data are multiplexed or composite, but it is also possible that the steps 222, 223, 224 are performed sequentially, in any order.

In a third suboperation 230, the host 3 processes the user identity RI and the identity Validity information RV and performs an Identity Check by consulting the memory 5 (IC; step 231) to check whether the information received corresponds to an authorized person. From the memory 5, the host 3 receives back information (AP; step 232) confirming whether the person is authorized and what are the portions of the data base accessible to this person. If the person is not known to the host (i.e. not authorized), or if the identity is not validly authenticated, this will be reflected in the information AP received back by the host.

In a fourth suboperation 240, the host 3 processes the authentication type information RT as input value to consult the reliability value definition memory 10 (step 241) and to calculate a reliability value R (step 242) on the basis of the relationship stored in reliability value definition memory 10.

In a fifth suboperation 250, the host 3 processes the requested data RD as input value to consult the reliability threshold definition memory 20 (step 251) and to retrieve from this memory a predefined reliability threshold value RTV (step 252) set for the data requested by the request.

In a sixth suboperation 260, the host 3 performs a comparising step 261 in which the host compares the reliability value R with the reliability threshold value RTV. If the comparison result shows that reliability value R is lower than the required reliability threshold value RTV, the host will abort the data retrieval process, otherwise the host will move on to a seventh suboperation 270 in which the host processes the requested data RD as input value to consult the database 4 and to retrieve the requested data DD from the database (step 272) and communicate this data DD to the user PC 1 (step 273), where this data DD is made available to the user, for instance by display on a screen (not shown for sake of simplicity) or printing on a printer (not shown for sake of simplicity).

Thus, the present invention provides a data processing system 100 comprising:
a database 4;
a host computer 3 and a user computer 1 capable of communicating with each other over a network 2;
wherein the user computer sends a data request message RQ to the host computer 3, the request message containing Data information RD, Identity information RI, and Authenticity information VI, wherein the host computer 3 checks the authentication information and only sends the required data if the Identity information RI defines an authorized user and the authentication information VI authenticates the user identification information.

The request message further contains secondary information RT and the host computer 3 calculates, from the secondary information, a reliability value R, compares the calculated reliability value with a predefined reliability threshold, and sends the required data only if the reliability value is at least as high as the reliability threshold.

It should be clear to a person skilled in the art that the present invention is not limited to the exemplary embodiments discussed above, but that several variations and modifications are possible within the protective scope of the invention as defined in the appending claims.

For instance, it is noted that the memories 5, 10 and 20 may be separate memories but may also be sections of one and the same memory, and may even be integrated with the database 4.

It is further noted that the third, fourth and fifth suboperations 230, 240, 250 may be run in parallel but may also be executed sequentially, in any order. Obviously, if the information AP received back by the host 3 in step 232 indicates that the user is not authorized, it is not necessary any more to execute suboperations 240 and 250.

It is further noted that, instead of data access to a database, it is also possible that physical access to protected spaces (buildings, floors, rooms) can also be handled in the same way.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

What is claimed is

1. Data processing system comprising:
    a database;
    a host computer associated with the database;
    and a user computer;
    wherein the user computer and the host computer are capable of communicating with each other over a network;
    wherein the user computer is capable of sending a data request message to the host computer, and wherein the host computer is capable of processing the request message, retrieving the requested data from the database, and sending a response message containing the requested data to the user computer;
    wherein the request message contains data information defining the requested data, identity information defining the identity of the user, and authenticity information authenticating the user identification information, wherein the host computer is designed to check authentication information and to only send the requested data if the identity information defines an authorized user and authentication information authenticates the user identification information;
    wherein the request message further contains secondary information regarding the authentication method used;
    wherein the host computer is equipped with a reliability value definition memory containing a relationship between the secondary information and a reliability value; and
    wherein the host computer is designed to calculate, from the secondary information in the received request message, the reliability value using said relationship in said reliability value definition memory, to compare the calculated reliability value with a predefined reliability threshold, and to only send the requested data if the reliability value is at least as high as the reliability threshold;
    wherein the host computer is equipped with a reliability value threshold memory containing a relationship between data in the database and a reliability threshold for this data;
    wherein the host computer is designed to process the data information to calculate the reliability threshold for the requested data;
    and wherein the host computer is designed to compare the reliability value of authentication with the reliability threshold for the requested data, and to only send the requested data if the reliability value is at least as high as the reliability threshold.

2. System according to claim 1, wherein the authenticity information defines the authentication method used and includes information defining the apparatus used and information defining the card used.

3. System according to claim 1, wherein the network comprises one or more of a wireless communication path and wired communication path.

4. Host computer for a data processing system, the host computer being associated with a database;
    wherein the host computer is capable of receiving a data request message sent from a user computer over a network;
    wherein the host computer is capable of processing the request message, retrieving the requested data from the database, and sending a response message containing the requested data to the user computer;
    requested data to the user computer;
    wherein the request message contains data information defining the requested data identity information defining the identity of the user and authenticity information authenticating the user identification information;
    wherein the host computer is designed to derive identity information and authenticity information from the request message, to check the identity information and authentication information and to only send the requested data if the identity information defines an authorized user and authentication information authenticates the user identification information;
    wherein the request message further contains secondary information regarding the authentication method used;
    wherein the host computer is equipped with a reliability value definition memory containing a relationship between the secondary information and a reliability value; and
    wherein the host computer is designed to derive secondary information from the request message, to calculate a reliability value from the secondary information in the received request message, to compare the calculated reliability value with a predefined reliability threshold, and
    to only send the requested data if the reliability value is at least as high as the reliability threshold.

5. System according to claim 1, wherein the authentication method used comprises one or more of a card reader and fingerprint scanner.

6. System according to claim 2, wherein the information defining the apparatus used comprises one or more of a manufacturer and type.

7. System according to claim 2, wherein the information defining the card used comprises one or more of a manufacturer, type, and age.

8. Host computer for a data processing system, the host computer being associated with a database;

wherein the host computer is capable of receiving a data request message sent from a user computer over a network;

wherein the host computer is capable of processing the request message, retrieving the requested data from the database, and sending a response message containing the requested data to the user computer;

wherein the request message contains data information defining the requested data, identity information defining the identity of the user, and authenticity information authenticating the user identification information;

wherein the host computer is designed to check authentication information and to only send the requested data if the identity information defines an authorized user and authentication information authenticates the user identification information;

wherein the request message further contains secondary information regarding the authentication method used;

wherein the host computer is equipped with a reliability value definition memory containing a relationship between the secondary information and a reliability value; and wherein the host computer is designed to calculate, from the secondary information in the received request message, the reliability value using said relationship in said reliability value definition memory, to compare the calculated reliability value with a predefined reliability threshold, and to only send the requested data if the reliability value is at least as high as the reliability threshold.

* * * * *